US012762211B2

(12) United States Patent
Chiu et al.

(10) Patent No.: US 12,762,211 B2
(45) Date of Patent: Oct. 13, 2026

(54) REGION METRICS FOR CLASS BALANCING IN MACHINE LEARNING SYSTEMS

(71) Applicant: SRI International, Menlo Park, CA (US)

(72) Inventors: Han-Pang Chiu, West Windsor, NJ (US); Junjiao Tian, Atlanta, GA (US); Zachary Seymour, Pennington, NJ (US); Niluthpol C. Mithun, Lawrenceville, NJ (US)

(73) Assignee: SRI International, Menlo Park, CA (US)

( * ) Notice: Subject to any disclaimer, the term of this patent is extended or adjusted under 35 U.S.C. 154(b) by 707 days.

(21) Appl. No.: 17/478,177

(22) Filed: Sep. 17, 2021

(65) Prior Publication Data

US 2022/0092366 A1 Mar. 24, 2022

Related U.S. Application Data

(60) Provisional application No. 63/082,837, filed on Sep. 24, 2020.

(51) Int. Cl.
*G06F 18/2415* (2023.01)
*G06F 18/21* (2023.01)
(Continued)

(52) U.S. Cl.
CPC ........ *G06F 18/2415* (2023.01); *G06F 18/214* (2023.01); *G06F 18/2193* (2023.01); *G06F 18/2431* (2023.01); *G06N 20/00* (2019.01)

(58) Field of Classification Search
CPC ............. G06F 18/2415; G06F 18/2193; G06F 18/214; G06F 18/2431; G06N 20/00
See application file for complete search history.

(56) References Cited

U.S. PATENT DOCUMENTS

2021/0089807 A1* 3/2021 Liu ........................ G06V 20/70

FOREIGN PATENT DOCUMENTS

| | | | | |
|---|---|---|---|---|
| KR | 2159817 B1 | * | 9/2020 | |
| KR | 102159817 B1 | * | 9/2020 | ................ H02J 3/32 |
| RU | 2707147 C1 | * | 11/2019 | ....... G06V 30/18057 |

OTHER PUBLICATIONS

Badrinarayanan et al., "SegNet: A Deep Convolutional Encoder-Decoder Architecture for Image Segmentation," IEEE Transactions on Pattern Analysis and Machine Intelligence, 39(12): Dec. 2017, pp. 2481-2495.

(Continued)

*Primary Examiner* — Wednel Cadeau
(74) *Attorney, Agent, or Firm* — Shumaker & Sieffert, P.A.

(57) ABSTRACT

Techniques are disclosed for an image understanding system comprising a machine learning system that applies a machine learning model to perform image understanding of each pixel of an image, the pixel labeled with a class, to determine an estimated class to which the pixel belongs. The machine learning system determines, based on the classes with which the pixels are labeled and the estimated classes, a cross entropy loss of each class. The machine learning system determines, based on one or more region metrics, a weight for each class and applies the weight to the cross entropy loss of each class to obtain a weighted cross entropy loss. The machine learning system updates the machine learning model with the weighted cross entropy loss to improve a performance metric of the machine learning model for each class.

20 Claims, 5 Drawing Sheets

(51) Int. Cl.
*G06F 18/214* (2023.01)
*G06F 18/2431* (2023.01)
*G06N 20/00* (2019.01)

(56) References Cited

OTHER PUBLICATIONS

Berman et al., "The Lovasz-Softmax loss: A tractable surrogate for the optimization of the intersection-over-union measure in neural networks," 2018 IEEE/CVF Conference on Computer Vision and Pattern Recognition, Jun. 18-23, 2018, pp. 4413-4421.
Cabon et al., "Virtual KITTI 2," arxiv.org; arXiv:2001.10773v1, Jan. 2020, 11 pp.
Cao et al., "Learning Imbalanced Datasets with Label-Distribution-Aware Margin Loss." Advances in Neural Information Processing Systems 32 (NeurIPS 2019), Vancouver, Canada, Dec. 8-14, 2019, 12 pp.
Chan et al., "Application of Decision Rules for Handling Class Imbalance in Semantic Segmentation," arxiv.org; arXiv: 1901.08394v1, Jan. 24, 2019, 11 pp.
Chen et al., "Rethinking Atrous Convolution for Semantic Image Segmentation," arxiv.org; arXiv:1706.05587v3, Dec. 5, 2017, 14 pp.
Chen et al., "Semantic Image Segmentation with Deep Convolutional Nets and Fully Connected CRFs," arxiv.org; arXiv:1412.7062v1, Dec. 22, 2014, 11 pp.
Cordts et al., "The Cityscapes Dataset for Semantic Urban Scene Understanding," In Proceedings of the 2016 IEEE Conference on Computer Vision and Pattern Recognition (CVPR), Las Vegas, Nevada, Jun. 27-30, 2016, pp. 3213-3223.
Cui et al., "Class-Balanced Loss Based on Effective Numbers of Samples," In Proceedings of the IEEE/CVF Conference on Computer Vision and Pattern Recognition (CVPR), Long Beach, California, Jun. 16-20, 2019, pp. 9268-9277.
Dong et al., "Imbalanced Deep Learning by Minority Class Incremental Rectification," arxiv.org; arXiv:1804.10851v1, EEE Transactions on Pattern Analysis and Machine Intelligence, 41(6), Apr. 28, 2018, pp. 1367-1381.
Eelbode et al., "Optimization for Medical Image Segmentation: Theory and Practice when evaluating with Dice Score or Jaccard Index," IEEE Transactions on Medical Imaging, Jun. 2020, 15 pp.
Eigen et al., "Predicting Depth, Surface Normals and Semantic Labels with a Common Multi-Scale Convolutional Architecture," in Proceedings of the 2015 IEEE International Conference on Computer Vision (ICCV), Santiago, Chile, Dec. 7-13, 2015, pp. 2650-2658.
Hayat et al., "Gaussian Affinity for Max-margin Class Imbalanced Learning," In Proceedings of the 2019 IEEE/CVF International Conference on Computer Vision (ICCV), Seoul, Korea, Oct. 27-Nov. 2, 2019, pp. 6469-6479.
He et al., "Deep Residual Learning for Image Recognition," In Proceedings of the 2016 IEEE Conference on Computer Vision and Pattern Recognition (CVPR), Las Vegas, Nevada, Jun. 27-30, 2016, pp. 770-778.
Jiang et al., "Incorporating Depth into both CNN and CRF for Indoor Semantic Segmentation," arxiv.org; arXiv:1705.07383v1, 2017 8th IEEE International Conference on Software Engineering and Service Science (ICSESS). IEEE, May 21, 2017, 7 pp.
Kang et al., "Decoupling Representation and Classifier for Long-Tailed Recognition," arxiv.org; arXiv:1910.09217v, Feb. 19, 2020, 16 pp.
Khan et al., "Cost-Sensitive Learning of Deep Feature Representations from Imbalanced Data," Published in IEEE Transactions on Neural Networks and Learning Systems 2018; 29(8): Mar. 23, 2017, 15 pp.
Khan et al., "Striking the Right Balance with Uncertainty", In Proceedings of the IEEE/CVF Conference on Computer Vision and Pattern Recognition (CVPR), Long Beach, California, Jun. 16-20, 2019, pp. 103-112.
Kingma et al., "Adam: A Method for Stochastic Optimization," arXiv.org; arXiv:1412.6980v1, Dec. 22, 2014, 9 pp.
Lin et al., "Focal Loss for Dense Object Detection," In Proceedings of the 2017 IEEE International Conference on Computer Vision (ICCV), Venice, Italy, Oct. 22-29, 2017, pp. 2980-2988.
Liu et al., "Large-Scale Long-Tailed Recognition in an Open World," In Proceedings of the IEEE/CVF Conference on Computer Vision and Pattern Recognition (CVPR), Long Beach, California, Jun. 16-20, 2019, pp. 2537-2546.
Rahman et al., "Optimizing Intersection-Over-Union in Deep Neural Networks for Image Segmentation," Springer, Advances in Visual Computing: 12th International Symposium, ISVC 2016, Las Vegas, Nevada, Dec. 12-14, 2016, 11pp.
Ros et al., "The SYNTHIA Dataset: A Large Collection of Synthetic Images for Semantic Segmentation of Urban Scenes," In Proceedings of the 2016 IEEE Conference on Computer Vision and Pattern Recognition (CVPR), Las Vegas, Nevada, Jun. 27-30, 2016, pp. 3234-3243.
Salehi et al., "Tversky loss function for image segmentation using 3d fully convolutional deep networks," arxiv.org; arXiv:1706.05721v1, Jun. 18, 2017, 9 pp.
Shrivastava et al., "Training Region-based Object Detectors with Online Hard Example Mining," In Proceedings of the 2016 IEEE Conference on Computer Vision and Pattern Recognition (CVPR), Las Vegas, Nevada, Jun. 27-30, 2016, pp. 761-769.
Song et al., "Deep Metric Learning via Lifted Structured Feature Embedding," In Proceedings of the 2016 IEEE Conference on Computer Vision and Pattern Recognition (CVPR), Las Vegas, Nevada, Jun. 27-30, 2016, pp. 4004-4012.
Sudre et al., "Generalised Dice Overlap as a Deep Learning Loss function for Highly Unbalanced Segmentations," Springer International Publishing, Deep Learning in Medical Image Analysis and Multimodal Learning for Clinical Decision Support; Third International Workshop, DLMIA 2017, and 7th International Workshop, ML-CDS 2017, Held in Conjunction with MICCAI 2017, Que'bec City, Canada, Sep. 14, 2017, 9 pp.
Taghanaki et al., "Combo Loss: Handling Input and Output Imbalance in Multi-Organ Segmentation," arxiv.org; arXiv:1805.02798v5, Oct. 22, 2018, 9 pp.
Tian et al., "Recall Loss for Imbalanced Image Classification and Semantic Segmentation," OpenReview.net, ICLR 2021 Conference Blind Submission, Mar. 5, 2021, 14 pp., Retrieved from the Internet: URL: https://openreview.net/forum?id=SlprFTIQP3.
Tian et al., "Recall Loss for Imbalanced Image Classification and Semantic Segmentation," Sep. 28, 2020, 11 pp.
Tian et al., "Striking the Right Balance: Recall Loss for Semantic Segmentation," arxiv.org; arXiv:2106.14917v1, Jun. 28, 2021, 13 pp.
Van Horn et al., "The iNaturalist Species Classification and Detection Dataset," In Proceedings of the 2018 IEEE/CVF Conference on Computer Vision and Pattern Recognition (CVPR), Salt Lake City, Utah, Jun. 18-23, 2018, pp. 8769-8778.
Wang et al., "Seesaw Loss for Long-Tailed Instance Segmentation," arxiv.org; arXiv:2008.10032v2, Dec. 7, 2020, 13 pp.
Zhang et al., "Range Loss for Deep Face Recognition with Long-Tailed Training Data," In Proceedings of the 2017 IEEE International Conference on Computer Vision (ICCV), Venice, Italy, Oct. 22-29, 2017, pp. 5409-5418.
Zhou et al., "BBN: Bilateral-Branch Network with Cumulative Learning for Long-Tailed Visual Recognition," Proceedings of the IEEE/CVF Conference on Computer Vision and Pattern Recognition, Jun. 14-19, 2020, pp. 9719-9728.
Zhou et al., "Places: A 10 Million Image Database for Scene Recognition," IEEE Transactions on Pattern Analysis and Machine Intelligence;40(6), Jul. 2017, 14 pp.
Zhou et al., "Scene Parsing through ADE20k Dataset," Proceedings of the IEEE conference on computer vision and pattern recognition, Honolulu, Hawaii, Jul. 21-26, 2017, pp. 633-641.

* cited by examiner

REGION METRICS FOR CLASS BALANCING IN MACHINE LEARNING SYSTEMS

This application claims the benefit of U.S. Provisional Application No. 63/082,837, which was filed on Sep. 24, 2020, the entire content of which is incorporated herein by reference.

GOVERNMENT RIGHTS

This invention was made with government support under contract no. W9132V19C0003 awarded by the Engineering Research and Development Center (ERDC)-Geospatial Research Lab (GRL). The Government has certain rights in this invention.

TECHNICAL FIELD

This disclosure generally relates to machine learning systems.

BACKGROUND

Machine learning systems may be used to process images to generate various data regarding the image. For example, a machine learning system may process an image to identify one or more objects in the image. Some machine learning systems may apply a trained machine learning model, such as a convolutional neural network model, to process the image. Machine learning systems may require a large amount of "training data" to build an accurate model. However, once trained, machine learning systems may be able to perform a wide variety of image-recognition tasks previously thought to be capable only by a human being. For example, machine learning systems may have use in a wide variety of applications, such as security, commercial applications, scientific and zoological research, and industrial applications such as inventory management and quality control.

SUMMARY

In general, the disclosure describes techniques for training a machine learning model to perform image understanding of a plurality of pixels of an image. For example, an input device receives training data including an image comprising a plurality of pixels and one or more labels specifying a class of each pixel of the plurality of pixels. A computation engine executes a machine learning system configured to train a machine learning model with the training data to perform image understanding for each pixel of the plurality of pixels of the image. The machine learning model performs, for each pixel of the plurality of pixels of the image, image understanding to determine an estimated class of the plurality of classes to which the pixel belongs. The machine learning system determines a cross entropy loss of the machine learning model for each class of the plurality of classes. The cross entropy loss indicates, for each class, a probability that the machine learning model correctly determined an estimated class of a pixel that is the same as a class with which the pixel is labeled.

The machine learning system applies region metrics to generate weights for each class of the plurality of classes. In some examples, the region metrics are computed according to a loss function, such as a Recall loss function, a Precision loss function, a Dice loss function, a Jaccard loss function, or a Tversky loss function. The machine learning system applies, to the cross entropy loss of each class of the plurality of classes, the determined weight to generate a weighted cross entropy loss for the class. The machine learning system may use the weighted cross entropy loss as a loss function and attempt to minimize the weighted cross entropy loss so as to optimize the machine learning model for performing image understanding. The machine learning system may iteratively apply the machine learning model to the training data, generate updated weights for each class, and apply the updated weights to the cross entropy loss so as to dynamically adjust the weighted cross entropy loss of the machine learning model. In some examples, the system further includes an output device that outputs the estimated class of each pixel of the plurality of pixels of the image to, e.g., generate navigation information for use by a moving vehicle or a mobile platform.

The techniques of the disclosure may provide specific improvements to the computer-related field of image understanding, which includes the fields of semantic segmentation, object detection, object classification, and image recognition, that have numerous practical applications. For example, the techniques disclosed herein may enable a machine learning system to train a machine learning model to perform image understanding of images even where the training data used to train the machine learning model includes classes of objects that are unevenly distributed or underrepresented within the training data. Additionally, the techniques disclosed herein may enable a machine learning model to perform image understanding using a loss function that provides improved precision, accuracy, and performance improvements over other types of machine learning models, especially for shallow networks. Furthermore, such a machine learning model as described herein may be less sensitive to rebalancing losses with respect to minority classes. In some examples, a machine learning model as described herein may improve a performance metric of the machine learning model for each class. For example, a machine learning model as described herein may improve accuracy while maintaining a competitive Intersection Over Union (IOU) performance, improve recall of minority classes without introducing excessive false positives, thereby enhancing the balance between recall and precision, avoid excessive weighting of minority classes, and may be implemented on both synthetic and noisy real data.

In one example, this disclosure describes an image understanding system comprising: an input device configured to receive training data comprising an image comprising a plurality of pixels, each pixel of the plurality of pixels labeled with a class of a plurality of classes; and a computation engine comprising processing circuitry for executing a machine learning system, wherein the machine learning system is configured to: apply a machine learning model to perform image understanding of each pixel of the plurality of pixels to determine an estimated class of the plurality of classes to which the pixel belongs; determine, based on the classes with which the plurality of pixels are labeled and the estimated classes of the plurality of pixels, a cross entropy loss of each class of the plurality of classes; determine, based on one or more region metrics, a weight for each class of the plurality of classes; apply the weight for each class of the plurality of classes to the cross entropy loss of each class of the plurality of classes to obtain a weighted cross entropy loss of each class of the plurality of classes; and update the machine learning model with the weighted cross entropy loss of each class of the plurality of classes to improve a performance metric of the machine learning model for each class of the plurality of classes.

In another example, this disclosure describes a method for image understanding comprising: receiving, by an input device, training data comprising an image comprising a plurality of pixels, each pixel of the plurality of pixels labeled with a class of a plurality of classes; applying, by a machine learning system of a computation engine executed by processing circuitry, a machine learning model to perform image understanding of each pixel of the plurality of pixels to determine an estimated class of the plurality of classes to which the pixel belongs; determining, by the machine learning system and based on the classes with which the plurality of pixels are labeled and the estimated classes of the plurality of pixels, a cross entropy loss of each class of the plurality of classes; determining, by the machine learning system and based on one or more region metrics, a weight for each class of the plurality of classes; applying, by the machine learning system, the weight for each class of the plurality of classes to the cross entropy loss of each class of the plurality of classes to obtain a weighted cross entropy loss of each class of the plurality of classes; and updating, by the machine learning system, the machine learning model with the weighted cross entropy loss of each class of the plurality of classes to improve a performance metric of the machine learning model for each class of the plurality of classes.

In another example, this disclosure describes a non-transitory, computer-readable medium comprising instructions for causing processing circuitry of an image understanding system to: receive training data comprising an image comprising a plurality of pixels, each pixel of the plurality of pixels labeled with a class of a plurality of classes; and execute a machine learning system configured to: apply a machine learning model to perform image understanding of each pixel of the plurality of pixels to determine an estimated class of the plurality of classes to which the pixel belongs; determine, based on the classes with which the plurality of pixels are labeled and the estimated classes of the plurality of pixels, a cross entropy loss of each class of the plurality of classes; determine, based on one or more region metrics, a weight for each class of the plurality of classes; apply the weight for each class of the plurality of classes to the cross entropy loss of each class of the plurality of classes to obtain a weighted cross entropy loss of each class of the plurality of classes; and update the machine learning model with the weighted cross entropy loss of each class of the plurality of classes to improve a performance metric of the machine learning model for each class of the plurality of classes.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
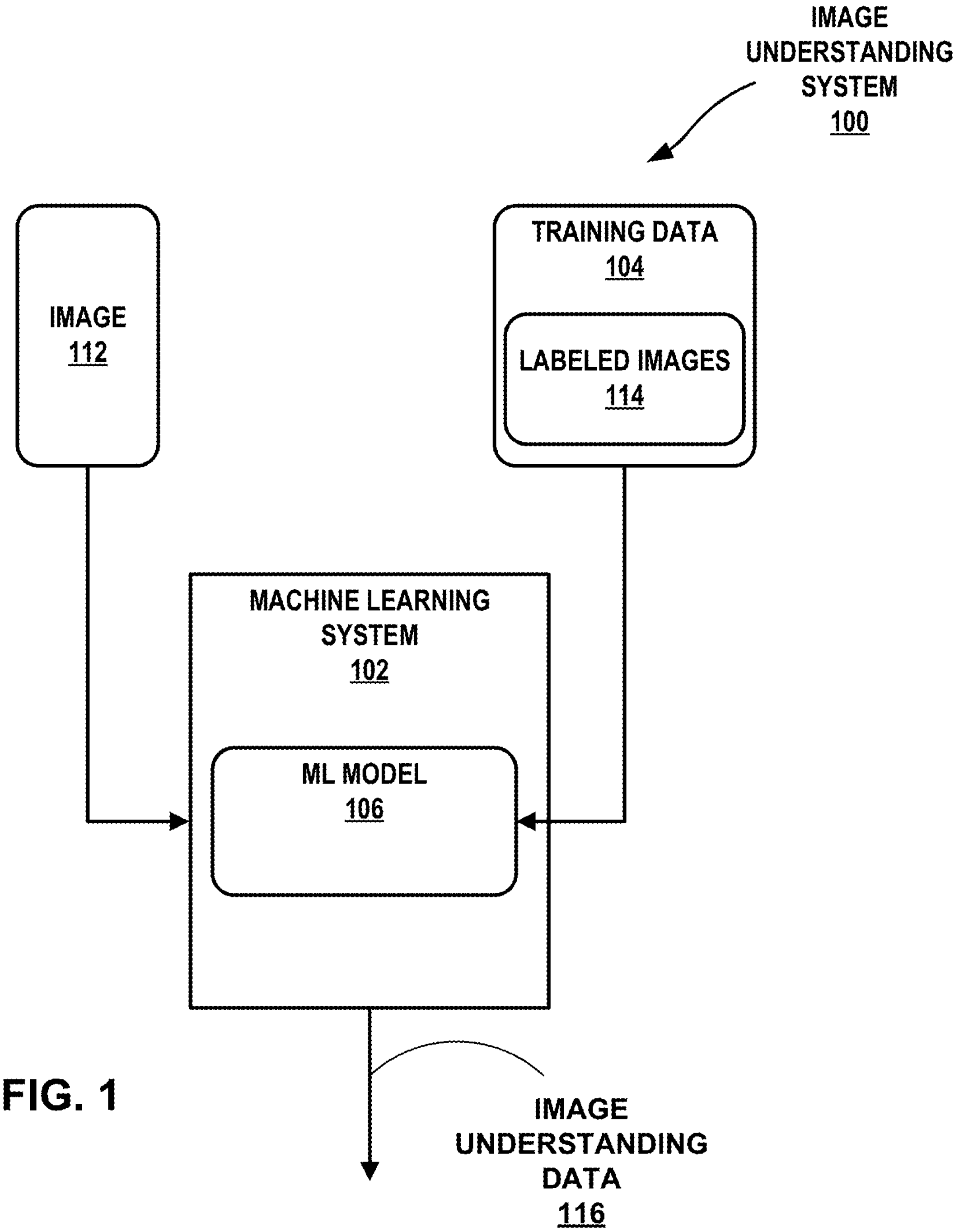
FIG. 1 is a block diagram illustrating an example image understanding system for performing image understanding of a plurality of pixels of an image in accordance with the techniques of the disclosure.

Class imbalance (also referred to herein as "dataset imbalance" or "uneven class distribution") is an important problem for many computer vision and image understanding tasks, such as semantic segmentation, object detection, object classification, and image recognition. Uneven class distributions in a training dataset often result in unsatisfactory performance on under-represented classes. In an example where the image understanding task is semantic segmentation, class imbalance may occur as a result of a natural frequency of occurrence of different classes as well as varying sample sizes of different classes. For example, in an outdoor driving segmentation dataset, light pole and pedestrian semantic classes may be considered minority classes compared to building, sky, and road semantic classes, because light pole and pedestrian semantic classes may have substantially less frequency of occurrence in the outdoor driving segmentation dataset. However, these minority classes may often be more important than majority classes for safety reasons. When presented with imbalanced datasets, a machine learning system that uses a conventional cross entropy loss function may yield unsatisfactory results as the training process biases towards majority classes. This may result in low accuracy and precision on minority classes.

In image understanding, imbalance may occur as a result of data collection. For example, some classes may be more difficult to obtain data for than others. For example, the iNaturalist dataset (Van Horn et al., 2018) has collected images of over 8000 natural animal species. Because some species are rare, the dataset exhibits a long-tail distribution. Uneven class distribution in a training dataset may result in a machine leaning system having unsatisfactory performance on underrepresented classes. For example, when presented with imbalanced datasets, a machine learning system using an unmodified cross entropy loss may often yield unsatisfactory results. This may occur because the training process may be biased towards classes with large representation in the training dataset, which may cause low accuracy and precision with respect to classes with minimal representation in the training dataset.

Some machine learning systems have attempted to weigh a cross entropy loss function with pre-computed weights based on class statistics such as the number of samples and class margins. However, this approach has two major drawbacks. First, by up-weighing minority classes, the machine learning system may introduce excessive false positives, especially in the field of semantic segmentation. Minority classes may be more sensitive to rebalancing losses, and therefore may require careful design to avoid excessive such false positives. Second, the use of pre-computed weights may have adversarial effects on representation learning. For example, a minority class is not necessarily a hard class. The use of pre-computed weights may result in low precision due to excessive false positives.

Additionally, class imbalance may affect metrics used by segmentation tasks. Some machine learning systems may use a performance metric, such as mean accuracy or mean IOU, to measure segmentation performance so that majority classes do not dictate the evaluation. Mean accuracy and mean IOU are important metrics for semantic performance of precision and recall. Mean accuracy is an indicator of the detection rate of each class, which may be important for safety-critical applications such as self-driving by autonomous vehicles. Mean IOU provides a more holistic view of the performance of a model than accuracy, and because of the inclusion of false positive, accuracy and IOU tend to trade-off one another other. However, a negative effect of relying solely on improving mean accuracy is that minority classes may become enlarged and possess indistinguishable boundaries. In a nutshell, the trade-off between recall and precision is a subjective decision. For semantic segmentation, especially for autonomous driving applications, both the recall of minority class and clear separation of individual objects is critical to safety and decision making. Therefore, it is important to improve recall performance while maintaining a competitive mean IOU without introducing excessive false positives.

A machine learning system may implement a cross entropy loss function that may fall into three general categories: region-based losses, statistics-balanced losses, and performance-balanced losses. Region-based loss functions attempt to directly optimize region metrics. Statistics-balanced loss functions attempt to up- or down-weight a contribution of a class based on its class size. However, statistics-balanced loss functions tend to encourage excessive false positives in minority classes to improve mean accuracy, which may be especially prevalent in semantic segmentation use cases. Performance-balanced loss functions use a performance indicator to weight a loss of each class. Use of terms herein having the root "optimize" refer to machine learning optimization, as would be understood to the person skilled in machine learning.

In accordance with the techniques of the disclosure, a machine learning system as described herein implements a hard-class mining loss by reshaping the cross entropy loss so as to weight a loss for each class dynamically based on region metrics, such as changing recall performance. A machine learning system as described herein may use a loss function based on one or more region metrics, such as a recall loss function. Such a machine learning system may apply loss changes gradually between the cross entropy loss and an inverse frequency cross entropy loss so as to balance precision and accuracy. Furthermore, a machine learning system as described herein may use a loss function based on one or more region metrics, such as a recall loss function, that effectively balances precision and accuracy on semantic segmentation datasets, and may lead to significant performance improvement over machine learning systems that use other types of loss functions for semantic segmentation, especially on shallow networks. Additionally, a machine learning system using a loss function based on one or more region metrics as described herein may improve representation learning on imbalanced datasets.

As described herein, a machine learning system as described herein uses a cross entropy loss function that is based on one or more region metrics to address the imbalance problem. In some examples, the one or more region metrics may include a recall metric (also referred to herein as a "recall loss function"). The recall loss function weighs the cross entropy loss for each class up or down based on the instantaneous training recall performance of that class. The recall loss function is an example of hard class mining, as opposed to a as opposed to a focal loss function, which implements a hard example mining strategy. Unlike statistics-balanced loss functions, a recall loss function as describe herein may dynamically change its weights with training based on per-class recall performance. The dynamism exhibited by the recall loss function may overcome many drawbacks of statistics-balanced loss functions. Further, while a loss function that uses fixed weighting improves accuracy at the expense of IOU, the region metric-based loss function described herein may effectively balance between precision and recall of each class, thereby improving accuracy while still maintaining a competitive IOU. Therefore, a machine learning system which uses a cross entropy loss function that is based on one or more region metrics as described herein may demonstrate significantly better performance than machine learning systems that use other types of loss functions. Additionally, while machine learning systems that use other types of loss functions may negatively affect representation learning, a machine learning system which uses a cross entropy loss function that is based on one or more region metrics as described herein may improve representation learning for imbalanced image understanding and outperform other types of representation learning methods. Furthermore, a machine learning system as described herein may demonstrate improved feature learning in image understanding.

FIG. 1 is a block diagram illustrating example image understanding system 100 for performing image understanding of a plurality of pixels of images 112, 114 in accordance with the techniques of the disclosure. As shown, system 100 includes image 112, training data 104 comprising labeled images 114, and machine learning system 102. In one example, machine learning system 102 is trained with training data 104 to perform image understanding. Further, machine learning system 102 generates image understanding data 116 for a plurality of pixels of image 112 and/or a plurality of pixels of labeled image 114.

In some examples, machine learning system 102 may comprise a computation engine implemented in circuitry. For instance, a computation engine of system 102 may include, any one or more of a microprocessor, a controller, a digital signal processor (DSP), an application specific integrated circuit (ASIC), a field-programmable gate array (FPGA), or equivalent discrete or integrated logic circuitry. In another example, system 102 may comprise any suitable computing system, such as desktop computers, laptop computers, gaming consoles, personal digital assistants (PDAs), smart televisions, handheld devices, tablets, mobile telephones, "smart" phones, etc. In some examples, at least a portion of system 102 may be distributed across a cloud computing system, a data center, or across a network, such as the Internet, another public or private communications network, for instance, broadband, cellular, Wi-Fi, and/or other types of communication networks, for transmitting data between computing systems, servers, and computing devices.

In some examples, system 102 may be implemented in circuitry, such as via one or more processors and/or one or more storage devices (not depicted). One or more of the devices, modules, storage areas, or other components of system 102 may be interconnected to enable inter-component communications (physically, communicatively, and/or operatively). In some examples, such connectivity may be provided by through system bus, a network connection, an inter-process communication data structure, or any other method for communicating data. The one or more processors of system 102 may implement functionality and/or execute instructions associated with system 102. Examples of processors include microprocessors, application processors, display controllers, auxiliary processors, one or more sensor hubs, and any other hardware configured to function as a processor, a processing unit, or a processing device. System 102 may use one or more processors to perform operations in accordance with one or more aspects of the present disclosure using software, hardware, firmware, or a mixture of hardware, software, and firmware residing in and/or executing at system 102.

One or more storage devices within system 102 may store information for processing during operation of system 102. In some examples, one or more storage devices are temporary memories, meaning that a primary purpose of the one or more storage devices is not long-term storage. Storage devices on system 102 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices, in some examples, also include one or more computer-readable storage media. Storage devices may be configured to store larger amounts of information than volatile memory. Storage devices may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices may store program instructions and/or data associated with one or more of the modules described in accordance with one or more aspects of this disclosure.

The one or more processors and one or more storage devices may provide an operating environment or platform for one or more modules, which may be implemented as software, but may in some examples include any combination of hardware, firmware, and software. The one or more processors may execute instructions and the one or more storage devices may store instructions and/or data of one or more modules. The combination of processors and storage devices may retrieve, store, and/or execute the instructions and/or data of one or more applications, modules, or software. The processors and/or storage devices may also be operably coupled to one or more other software and/or hardware components, including, but not limited to, one or more of the components illustrated in FIG. 2 below.

Machine learning system 102 processes training data 104 comprising labeled images 114 to train machine leaning model 106 to perform image understanding. Each of labeled images 114 comprises a plurality of individual pixels. Furthermore, each pixel of the plurality of pixels of each image 114 is labeled with a class to which the pixel belongs. In one example, the classes may include: Sky, Building, Pole, Road Marking, Road, Pavement, Tree, Sign Symbol, Fence, Vehicle, Pedestrian, and Bicycle. In other implementations, more, fewer, or other class labels may be used. In some examples, the plurality of classes comprises an imbalanced plurality of classes such that a first class is represented in training data 104 more frequently than a second class is represented in the training data. For example, in an autonomous driving application, a training dataset may include more examples of the classes "sky" and "road" often than examples of the classes "bicycle" and "pedestrian."

In some examples, training data 104 includes labeled images 114 of one or more objects. For example, each of images 114 may comprise an image of a navigation scene, such as may be taken by an autonomous vehicle during navigation through an environment. In some examples, training data 104 comprises a plurality of images that are converted into vectors and tensors (e.g., multi-dimensional arrays) upon which machine learning system 102 may apply mathematical operations, such as linear algebraic, nonlinear, or alternative computation operations. In some examples, training data 104 represents a set of normalized and standardized images depicting one or more objects that may be encountered during navigation of an autonomous vehicle through an environment. In some examples, statistical analysis, such as a statistical heuristic, is applied on training data 104 to determine a set of one or more images that are a representative sample of training data 104. In other examples, a big data framework is implemented so as to allow for the use of a large amount of available data as training data 104.

In some examples, machine learning system 102 uses training data 104 to teach machine learning model 106 to weigh different features depicted in the plurality of images of the one or more objects. In some examples, machine learning system 102 uses training data 104 to teach machine learning model 106 to apply different coefficients that represent features in the image as having more or less importance with respect to determining whether the feature represents an object or a sub-part of the object that is depicted in the image. The number of images required to train the image rendering model may depend on the number of objects and/or sub-parts to recognize, the complexity of the objects and/or sub-parts, and the variety and/or quality of the plurality of images. In some examples, the plurality of images includes at least several hundred examples to train an effective image rendering model. In some examples, machine learning system 102 uses training data 104 to optimize machine learning model 106 and increase the accuracy of results produced by machine learning model 106, as described in further detail below.

In one example, system 100 may additionally comprise test data (not depicted). The test data includes a plurality of images of one or more objects. Machine learning system 102 may apply trained machine learning model 106 to the test data to evaluate the accuracy of results produced by machine learning model 106 or an error rate of machine learning model 106. In some examples, Machine learning system 102 applies trained machine learning model 106 to the test data to validate that trained machine learning model 106 accurately identifies classes to which pixels of the image belong, etc. In some examples, machine learning system 102 applies trained machine learning model 106 to the test data to validate that trained machine learning model 106 performs accurately above a threshold percentage (e.g., 50%, 75%, 90%, 95%, 99%).

In some examples, machine learning model 106 is a convolutional neural network (CNN) model. A CCN comprises a plurality of convolutional filters. Each filter comprises a vector of weights and a bias. As described herein, the terms "filter" and "layer" of a CCN may be used interchangeably. In this example, the CNN model receives image 112 as an input, applies a convolution operation of a first filter of the plurality of filters to image 112, and passes the output of the first filter to the next filter of the plurality of filters. Thus, the CNN model applies each filter of the plurality of filters to an output of a previous filter of the plurality of filters. Further, an output of each filter may "map" to an input of a subsequent filter to form the neural network relationships of machine learning model 106. Thus, the CNN may "learn" or be trained to perform semantic segmentation by making incremental adjustments to the biases and weights of each of the filters that form the CNN.

In some examples, machine learning system 102 applies an error function to calculate an error of machine learning model 106. The error is a measurement of a deviation of machine learning model 106 from a correct prediction. An error may be a false positive, where machine learning model 106 determines that a first pixel has a high likelihood of belonging to a class to which the first pixel does not belong. As an example of a false positive within the field of autonomous navigation, machine learning model 106 might incorrectly estimate that a first pixel has a high likelihood of belonging to a "road" class, wherein the first pixel truly belongs to a "pedestrian" class. An error may also be a false negative, where machine learning model 106 determines that a second pixel has a low likelihood of belonging to a class to which the second pixel actually does belong. As an example of a false negative within the field of autonomous navigation, machine learning model 106 might incorrectly estimate that a second pixel has a low likelihood of depicting a "pedestrian" class, wherein the second pixel truly belongs to the "pedestrian" class.

In some examples, machine learning system 102 applies a loss function to different types of error measured by the error function so as to quantify the severity of a particular type of error made by machine learning model 106. The loss function may be defined by the severity of negative consequences resulting from an incorrect prediction by machine learning model 106. For example, if machine learning model 106 were to confuse a pixel depicting a "pedestrian" class as belonging to a "road" class, the error would have more serious consequences for autonomous driving applications than if machine learning model 106 were to confuse a pixel depicting a "tree" class as belonging to a "pole" class. Machine learning system 102 may optimize the predictions of machine learning model 106 by attempting to minimize a loss identified by the loss function.

A cross entropy loss comprises a probability that an estimated class to which a pixel of image 114 belongs corresponds to the class with which the pixel is labeled. Typically, machine learning system 102 computes the cross entropy loss for each class of the plurality of classes. Cross entropy is a measure of a difference between two probability distributions. Cross entropy is similar to KL divergence in that cross entropy is a measure of a total entropy between two probability distributions, while KL divergence is a measure of a relative entropy between two probability distributions. Cross entropy is typically used as a loss function for use in optimizing classification models, like logistic regression, artificial neural networks, and other types of machine learning models. For example, machine learning system 102 may optimize the predictions of machine learning model 106 by attempting to minimize the cross entropy of a loss identified by the loss function.

In accordance with the techniques of the disclosure, machine learning system 102 implements a cross entropy loss function that is based on one or more region metrics for training machine learning model 106 to perform image understanding of a plurality of pixels of labeled image 114. As an example of the techniques of the disclosure, machine learning system 102 receives training data 104 including image 114 comprising a plurality of pixels and one or more labels specifying a class of each pixel of the plurality of pixels. Machine learning system 102 trains machine learning model 106 with training data 104 to perform image understanding for each pixel of image 114. Machine learning model 106 performs, for each pixel of image 114, image understanding to determine an estimated class of the plurality of classes to which the pixel belongs. In some examples, machine learning model 106 generates, for each pixel of image 114, an estimated class and a confidence that the estimated class is correct (e.g., such as a probability that the estimated class corresponds to the class with which the pixel is labeled).

Machine learning system 102 determines, based on the classes with which the plurality of pixels are labeled and the estimated classes of the plurality of pixels, a cross entropy of machine learning model 106 for each class of the plurality of classes. For example, machine learning system 102 uses the classes with which the plurality of pixels are labeled to evaluate whether machine learning model 106 correctly estimated the classes of the plurality of pixels. The cross entropy indicates, for each class, a probability that machine learning model 106 correctly determined an estimated class of a pixel of image 114 that is the same as a class with which the pixel is labeled. Therefore, the cross entropy of each class is based on the accuracy of machine learning model 104 in correctly recognizing the class within pixels of image 114.

Machine learning system 102 determines, based on one or more region metrics, a weight for each class of the plurality of classes. In some examples, the region metrics are computed according to a loss function, such as a Recall loss function, a Precision loss function, a Dice loss function, a Jaccard loss function, or a Tversky loss function. As an example where the one or more region metrics are computed according to a recall loss function, machine learning system 102 computes, for each class, a weight based on an instantaneous training recall performance of machine learning model 106 for that class. Machine learning system 102 applies, to the cross entropy loss of each class of the plurality of classes, the determined weight to generate a weighted cross entropy loss for the class. Machine learning system 102 updates machine learning model 106 with the weighted cross entropy loss of each class of the plurality of classes. Therefore, machine learning system 102 may use the weighted cross entropy loss as a loss function and attempt to minimize the weighted cross entropy loss, thereby optimizing machine learning model 106 for performing image understanding.

In some examples, machine learning system 102 may iteratively apply machine learning model 106 to training data 104 to perform image understanding, determine the cross entropy loss of machine learning model 106 for each class, determine the weight for each class based on the one or more region metrics, obtain the updated weighted cross entropy loss for each class, and update machine learning model 106 with the weighted cross entropy loss of each class. Each iteration may cause machine learning system 102 to recalculate, based on the one or more region metrics, the weights for each class and update machine learning model 106 with the recalculated weighted cross entropy loss for each class of the plurality of classes. Machine learning system 102 may improve a performance metric of machine learning model 106 for each class of the plurality of classes, such as a mean accuracy or a mean IOU of machine learning model 106, with each training iteration. Therefore, by iteratively training machine learning model 106, machine learning system 102 may dynamically adjust the weights applied to the cross entropy loss, thereby improving learning and performance of machine learning model 106.

In some examples, to iteratively determine the weight for each class based on the region metrics, machine learning system 102 may reduce the weight for each class of the plurality of classes as the performance metric of machine learning model 106 for the class increases. Further, machine learning system 102 may increase the weight for each class of the plurality of classes as the performance metric of machine learning model 106 for the class decreases. In some examples, the performance metric is one of mean accuracy or mean IOU.

In some examples, after machine learning system 102 has trained machine learning model 106 to perform image understanding, machine learning system receives an input image, such as image 112. This may occur after machine learning system 102 has trained machine learning model 106 with labeled images 114 to perform image understanding to a predetermined level of accuracy. Image 112 comprises a plurality of pixels. In some examples, image 112 is an image captured of an environment of system 100, such as by one or more imaging devices of an autonomous vehicle (not depicted in FIG. 1). Typically, the pixels of image 112 are not labeled, e.g., do not include labels specifying classes to which the pixels belong. However, the pixels of image 112 may depict examples of the classes with which machine learning model 106 has been trained (e.g., with training data 104). As an example, the pixels of image 112 may depict examples of classes such as: Sky, Building, Pole, Road Marking, Road, Pavement, Tree, Sign Symbol, Fence, Vehicle, Pedestrian, and Bicycle.

Machine learning system 102 applies machine learning model 106 to perform image understanding of each pixel of image 112 to determine an estimated class of the plurality of classes to which the pixel belongs. Further, machine learning system 102 outputs image understanding data 116 based on the estimated class of each pixel of image 112. In some examples, image understanding data 116 comprises an identification of one or more classes to which each pixel of the plurality of pixels of image 112 belongs. In some examples, image understanding data 116 may comprise an indication of the estimated class of each pixel of image 112.

For example, machine learning system 102 may convert image 112 into one or more vectors and tensors (e.g., multi-dimensional arrays) that represent image 112. Trained machine learning model 106 may apply mathematical operations to the one or more vectors and tensors to generate a mathematical representation of one or more features of image 112. For example, as described above, trained machine learning model 106 may determine different weights that correspond to identified characteristics of one or more features of an pixel. Trained machine learning model 106 may apply the different weights to the one or more vectors and tensors of the one or more features of image 112 to generate image understanding data 116 for each pixel of a plurality of pixels of image 112. In some examples, machine learning system 102 outputs, for presentation to a user, image understanding data 116 for each pixel of a plurality of pixels of image 112.

In another example, system 100 uses image understanding data 116 to generate navigation data for use by an autonomous vehicle for navigation through an environment. Navigation data generated via the use of region metrics as a loss function as described herein may improve autonomous and navigation system in several ways. For example, system 100 may use the image understanding capability as described herein in conjunction with a camera installed on a moving platform (such as a moving vehicle, self-driving car, or mobile platform such as a smartphone, tablet, laptop, computer, etc.). Such a system as described herein may be able to more accurately detect and avoid obstacles and pedestrians than conventional systems, thereby increasing the safety of the autonomous system. In the context of image understanding, classes such as pedestrians may be consider minority classes compared to large classes, such as building, sky, and road classes. However, the minority classes are often more important than large classes for safety reasons. A system as described herein that uses region metrics for class balancing may provide improved accuracy of processing these minority classes. In addition, using visual features from static structures (such as roads and buildings), rather than moving objects (such as pedestrians and other moving vehicles), may improve the ability of such an image understanding system to estimate motion of a vehicle during the navigation process.

Figure 2:
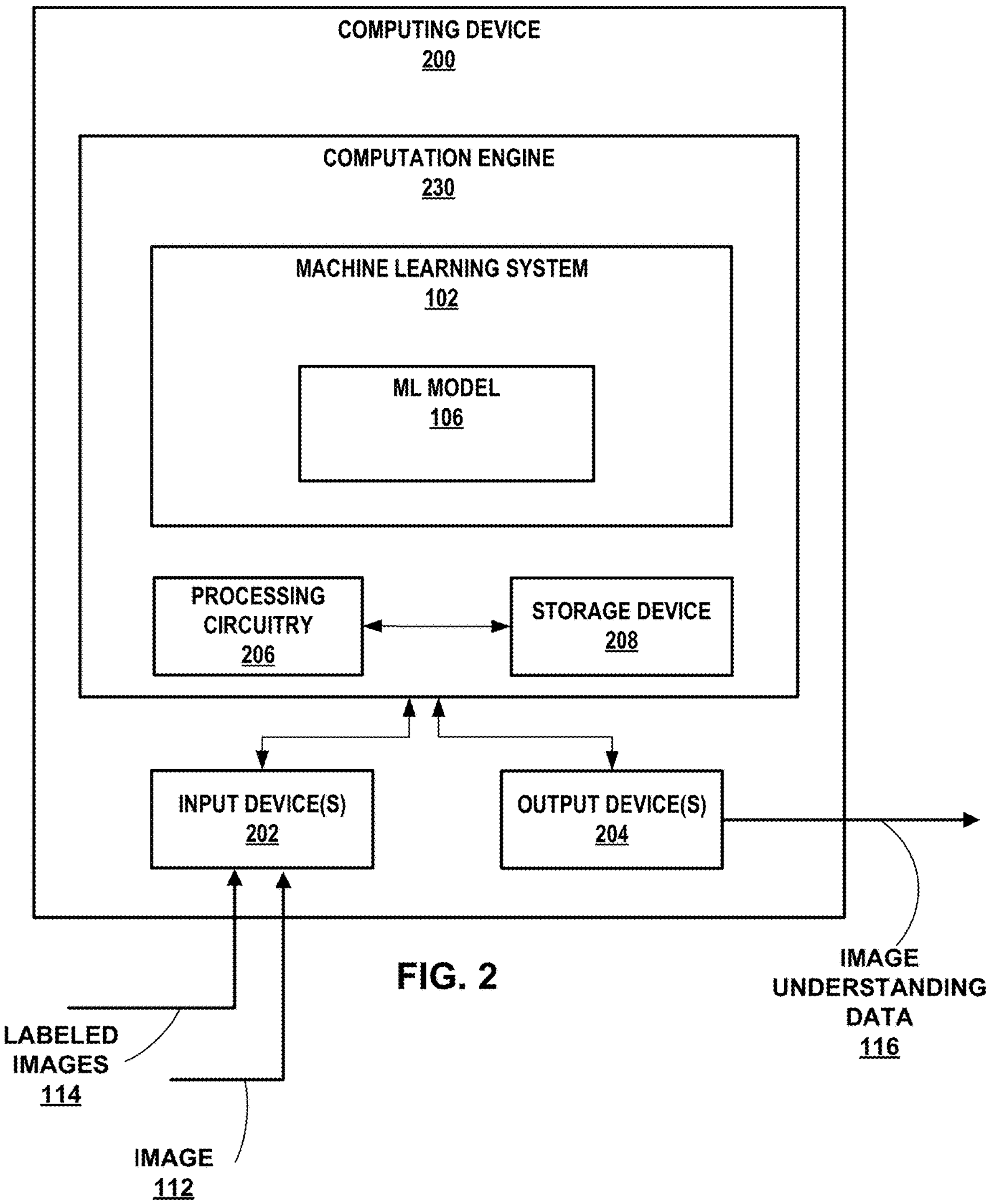
FIG. 2 is a block diagram illustrating an example computing device for performing image understanding of a plurality of pixels of a labeled image in accordance with the techniques of the disclosure.

FIG. 2 is a block diagram illustrating example computing device 200 for performing image understanding of a plurality of pixels of labeled images 114 in accordance with the techniques of the disclosure. In the example of FIG. 2, computing device 200 includes computation engine 230, one or more input devices 202, and one or more output devices 204.

In the example of FIG. 2, a user of computing device 200 may provide image 114 comprising a plurality of pixels to computing device 200 via one or more input devices 202. Input devices 202 may include a keyboard, pointing device, voice responsive system, video camera, biometric detection/response system, button, sensor, mobile device, control pad, microphone, presence-sensitive screen, network, or any other type of device for detecting input from a human or machine.

Computation engine 230 may process image 114 using machine learning system 102. Machine learning system 102 may represent software executable by processing circuitry 206 and stored on storage device 208, or a combination of hardware and software. Such processing circuitry 206 may include any one or more of a microprocessor, a controller, a digital signal processor (DSP), an application specific integrated circuit (ASIC), a field-programmable gate array (FPGA), or equivalent discrete or integrated logic circuitry. Storage device 208 may include memory, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. In some examples, at least a portion of computing device 200, such as processing circuitry 206 and/or storage device 208, may be distributed across a cloud computing system, a data center, or across a network, such as the Internet, another public or private communications network, for instance, broadband, cellular, Wi-Fi, and/or other types of communication networks, for transmitting data between computing systems, servers, and computing devices.

In accordance with the techniques of the disclosure, computation engine 230 may process labeled images 114 using machine learning system 102 to train machine learning model 106 to perform image understanding. For example, input device 202 receives labeled images 114. Each labeled image 114 comprises a plurality of pixels. Each pixel of the plurality of pixels of image 114 is labeled with a class of a plurality of classes. In one example, the classes may include: Sky, Building, Pole, Road Marking, Road, Pavement, Tree, Sign Symbol, Fence, Vehicle, Pedestrian, and Bicycle. In other implementations, more, fewer, or other class labels may be used. Thus, each pixel may further be labeled with a corresponding class to which the pixel belongs (e.g., sky, road, pedestrian, etc.).

Processing circuitry 206 of computation engine 230 executes machine learning system 102. In some examples, machine learning system 102 implements a convolutional neural network (CNN). However, other examples other types of neural networks may be used to implement the techniques of the disclosure. For example, machine learning system 102 may apply one or more of nearest neighbor, naïve Bayes, decision trees, linear regression, support vector machines, neural networks, k-Means clustering, Q-learning, temporal difference, deep adversarial networks, or other supervised, unsupervised, semi-supervised, or reinforcement learning algorithms to train one or more machine learning models 106 to perform image understanding of image 114.

Machine learning system 102 applies machine learning model 106 to image 114 to perform image understanding of each pixel of the plurality of pixels of image 114 so to determine an estimated class to which the pixel belongs. In some examples, machine learning model 106 generates, for each pixel of image 114, an estimated class and a confidence that the estimated class is correct (e.g., such as a probability that the estimated class corresponds to the class with which the pixel is labeled).

Machine learning system 102 determines, based on the classes with which the plurality of pixels are labeled and the estimated classes of the plurality of pixels, a cross entropy loss of each class of the plurality of classes. For example, machine learning system 102 uses the classes with which the plurality of pixels are labeled to evaluate whether machine learning model 106 correctly estimated the classes of the plurality of pixels. Machine learning system 102 computes, for each class of the plurality of classes, a cross entropy of the class based on the accuracy of machine learning model 104 in determining the estimated classes of the plurality of pixels.

Machine learning system 102 determines, based on one or more region metrics, a weight for each class of the plurality of classes. In some examples, the one or more region metrics are computed according to a loss function, such as a Recall loss function, a Precision loss function, a Dice loss function, a Jaccard loss function, or a Tversky loss function. As an example where the one or more region metrics are computed according to a recall loss function, machine learning system 102 computes, for each class, a weight based on an instantaneous training recall performance of machine learning model 106 for that class. Further, machine learning system 102 applies the determined weight for each class of the plurality of classes to the cross entropy loss of that class to obtain a weighted cross entropy loss of the class. Machine learning system 102 updates machine learning model 106 with the weighted cross entropy loss of each class of the plurality of classes.

In training machine learning model 106, machine learning system 102 may compute the cross entropy loss (also referred to herein as the "standard cross entropy loss"). The set $\{x_n, y_n,\}\forall n\in\{1, \ldots N\}$, where $x_n, \in Rd$, $yn\in\{1, \ldots C\}$, denotes a set of training data and corresponding labels. $P_n$ denotes a predictive softmax-distribution over all classes for input $x_n$ and $$P_n^i$$

denotes the probability of the i-th class. The cross entropy loss used by machine learning system 102 in multiclass classification is defined as according to:

$$CE = -\sum_{n=1}^{N} \log(p_n^{y_n}) = \sum_{c=1}^{C} \sum_{n:y_n=c} \log(P_n^{y_n}) = -\sum_{c=1}^{C} N_c \log(P^C), \quad \text{(Equation 1)}$$

where the equation $$P^c = \left(\Pi_{ny_n:=c} P_n^y n\right)^{1/N_c}$$

denotes the geometric mean confidence of class c and $N_c$ denotes a number of samples in class c. $\Sigma_{n:y_n}$=c denotes a summation over all examples in class c. As shown in Equation 1 above, the cross entropy optimizes a geometric mean confidence of each class weighted by a number of pixels in each class. Where a significant class imbalance exists in the dataset, the loss function biases towards majority classes as a result of larger $N_c$.

An inverse frequency cross entropy loss assigns more weight to a loss of minority classes than to a loss of majority classes. N denotes a total number of pixels in a training set and $N_c$ denotes a number of pixels belonging to class $c\in\{1, \ldots, C\}$. A frequency of a class is calculated as freq(c)=$N_c$ N. While the unweighted cross entropy loss optimizes an overall confidence, a loss weighted by inverse frequency optimizes a mean confidence. For a machine learning system that uses inverse frequency weighting, the loss is rebalanced. The N in freq(c) is omitted in the foregoing example because it is shared by all classes.

$$InvCE = -\sum_{c=1}^{C} \frac{1}{freq(c)} N_C \log(P^C) = -\sum_{c=1}^{C} \frac{1}{N_c} N_C \log(P^c) = -\sum_{c=1}^{C} \log(P^c) \quad \text{(Equation 2)}$$

As shown in Equation 2 above, a weighted loss improves, and in some cases optimizes, a geometric mean of accuracy. However, the inverse frequency loss may not be optimal in practice because it over-weighs minority classes and introduces excessive false positives, e.g., by sacrificing precision for recall. For example, the inverse frequency loss may sacrifice precision for recall. This problem may be especially severe in semantic segmentation. Applying the inverse frequency loss to segmentation increases recall for each class. However, the improvement may come at the cost of excessive false positives, especially for minority classes.

While the inverse frequency loss may mitigate class imbalance, the inverse frequency loss focuses only on improving one aspect of the problem in classification, i.e., the recall of each class. A machine learning system as described herein may weigh the inverse frequency loss in Equation 2, above, with a false negative ($FN_c$) count for each class. $FN_c$ is bounded by a total number of samples in a class and zero:

$$N_c \geq FN_c \geq 0 \quad \text{(Equation 3)}$$

By weighting the inverse frequency cross entropy loss in Equation 2 by the false negative counts for each class, machine learning system 102 obtains a moderate loss function which provides a middle ground between the regular cross entropy loss and inverse frequency loss.

$$\text{Recall } CE = -\sum_{c=1}^{C} FN_c \log(P^c) = \sum_{c=1}^{C} \frac{FN_c}{N_c} N_c(P^c) = -\sum_{c=1}^{C} \frac{FNc}{FN_c + TP_c} N_c \log(P^c), \quad \text{(Equation 4)}$$

wherein $FN_c + TP_c = N_c$. A noticeable property of the recall loss function is that the false negative counts for each class change dynamically as a result of training. This design improves recall while maintaining precision.

As Equation 4 above demonstrates, machine learning system 102 may implement the loss as a regular cross entropy loss weighted by class-wise false negative rate ($FN_R$). $FN_R$ is a metric of a model's performance. Minority classes are most likely to be more difficult to classify due to minority classes having with higher $FN_R$ and majority classes having smaller $FN_R$. Therefore, similar to inverse frequency loss, machine learning system 102 may boost gradients of minority classes and suppress gradients of majority classes. However, unlike frequency weighting, machine learning system 102 may not apply a weighting as extreme as set forth in Equation 3, above.

As machine learning system 102 continuously updates the parameters of machine learning model 106, $FN_R$ changes. Therefore, the weights for each class change dynamically to reflect the instantaneous performance of machine learning model 106. In view of this, Equation 4 is presented below with subscript t denoting the time dependency:

$$\text{Recall } CE = -\sum_{c=1}^{C} \left(1 - \frac{TP_{c,t}}{FN_{c,t} + TP_{c,t}}\right) N_c \log(p^{c,t}) = -\sum_{c=1}^{C} \Sigma_{n:y_i=c} (1 - R_{c,t}) \log(p_{n,t}), \quad \text{(Equation 5)}$$

wherein $R_{c,t}$ is a recall for class c at optimization step t. $n{:}y_i{=}c$ denotes all samples such that the ground truth label $y_i$ is class c.

Another performance-balanced loss is focal loss. Focal loss may be advantageous for background-foreground imbalance in object detection. The focal loss function weighs a cross entropy loss of each sample by 1−p, wherein p is a predicted probability or confidence. Intuitively, hard samples may have low confidence, and therefore a high weight. Focal loss may be considered to be an example of hard-example mining loss. Focal loss is represented with the following function:

$$FocalCE = -\sum_{n=1}^{N} \left(1 - p_{n,t}^{y_n}\right)^{\gamma} \log p_{n,t}^{y_n} = -\sum_{c=1}^{C} \sum_{n:y_n=c} (1 - p_{n,t})^{\gamma} \log(p_{n,t}), \quad \text{(Equation 6)}$$

wherein $$p_{n,t}^{y_n}$$

is a predicted probability of class $y_n$ for sample n at time t, and $\gamma$ is a scalar hyperparameter.

Focal loss dynamically adjusts a weight for each sample depending on a difficulty of the sample and the performance of the model. However, focal loss may not be specifically effective against imbalanced classification problems, and may produce poor performance for such imbalanced training datasets. In contrast to focal loss, a loss function as described herein that is based on region metrics, such as recall loss, may be seen as a class-wise focal loss with $\gamma=1$ and a per-class metric $R_{c,t}$ replacing per-sample probability $$p_{n,t}^{y_n}.$$

The recall loss function described herein may be more effective than a focal loss function in dealing with imbalance in semantic segmentation use cases.

In accordance with the techniques of the disclosure, machine learning system 102 bases the cross entropy loss function on one or more region metrics. In the following example, the region metric is a Recall loss function. However, the region metric may include other types of loss functions, such as a Recall loss function, a Precision loss function, a Dice loss function, a Jaccard loss function, an F1 loss function, a Tversky loss function, or other types of loss functions not expressly described herein.

To validate the claim that recall loss balances recall and precision, a gradient analysis of the recall loss is set forth below. For purposes of clarify, a binary classification task is described. The sets $[z_1, z_2]$ and $[P_1, P_2]$ denote a pre-softmax logits and post-softmax probabilities of a classifier, respectively. The gradient for a standard cross entropy loss function with respect to the logits for a single input is defined as:

$$\nabla_{z_i} CE = -\log(p^y) = -\log\left(\frac{ezy}{\Sigma_i e^{z_i}}\right) + P_i - I(y = i), \quad \text{(Equation 7)}$$

wherein I(y=i) equals 1 if y=1 and equals 0 otherwise. A dataset includes a number of samples $N_1$ and $N_2$ for each class. The gradients of the recall loss with respect to the logit of the first class, $z_1$, is:

$$\nabla_{z1} RecallCE = -\nabla_{z1}\left[(1 - R_1)\sum_{n=1}^{N_1} \log\left(p_n^1\right) + (1 - R_2)\sum_{n=1}^{N_2} \log\left(p_n^2\right)\right] = (1 - R_1)\sum_{n=1}^{N_1}\left(p_{1,n}^1 - 1\right) + 11 - R_2\sum_{n=1}^{N_2}\left(p_{1,n}^{(2)}\right) = N_1\left(p_1^{(1)} - 1\right) + FN_2 P_1^{(2)}, \quad \text{(Equation 8)}$$

wherein the superscript (j) in $$P_i^{(j)}$$

denotes a ground truth class and the subscript denotes the class with respect to which gradient is calculated $$P_1^{(1)} = \frac{1}{N_1}\sum_{n=1}^{N_1} p_{1,n}^{(1)}$$

denotes an average confidence of class 1 when it is the ground truth class and $$P_1^{(2)} = \frac{1}{N_2}\sum_{n=1}^{N_2} p_{1,n}^{(2)}$$

denotes the average confidence of class 1 when the ground truth class is 2.

To see how the recall loss affects gradients back-propagation to the logits, the ratio of gradients is set forth below:

$$\frac{\nabla_{z_1} RecallCE}{\nabla_{z_2} RecallCE} = \frac{FN_1\left(P_1^{(1)} - 1\right) + FN_2 P_1^{(2)}}{FN_2\left(P_2^{(2)} - 1\right) + FN_1 P_2^{(1)}} = \frac{FN_1\left(P_1^{(1)} - 1\right) + FP_1 P_1^{(2)}}{FN_2\left(P_2^{(2)} - 1\right) + FP_2 P_2^{(1)}} \quad \text{(Equation 9)}$$

The numerator/denominator is a sum of two terms. The first term of the numerator, $$FN_1\left(P_1^{(1)} - 1\right),$$

and the first term of the denominator, $$FN_2\left(P_2^{(2)} - 1\right),$$

encourage recall. The second term of the numerator, $$FP_1 P_1^{(2)},$$

and the second term of the denominator, $$FP_2 P_2^{(1)},$$

regularize precision. The first term of the numerator includes gradients from samples from the ground truth class 1. The first term intuitively encodes that the recall loss incurs a larger negative gradient to the class with larger false negatives (FN). This penalty directly encourages recall improvement because $P-1<0$, and in gradient descent, the gradient is subtracted. The second term of the numerator includes the non-ground truth gradient contribution. The recall loss function uses the fact that in a binary classification problem, a false negative of one class is a false positive (FP) of the other to derive the second term. Therefore, excessive false positive in a class results in a large positive gradient which is subtracted from the logits. This behavior regularizes excessive false positives and maintains precision.

The recall loss function described herein is designed to reflect an instantaneous training performance of machine learning model 106 on the current input data. A straightforward way is to estimate the recall based on current batch statistics, for example, by counting false positives for each class from an entire batch. This method provides a reliable estimation of the current performance of machine learning model 106 if there is a sufficient number of samples for each class in the batch. Intuitively for classification, batch recall is a good estimation if the number of classes is not much larger than the batch size. For semantic segmentation, batch recall is almost always reliable since each image contains hundreds of pixels for each class. For subsequent segmentation, batch recall loss may be calculated as follows:

$$R_{c,t} = \frac{TP_{c,t}}{TP_{c,t} + FN_{c,t}} \quad \text{(Equation 10)}$$

For classification, estimating recall may be problematic for a large number of classes. As an example, for a dataset including 8,142 classes and a batch size of 128, it may be difficult to sample sufficient data for any class. To mitigate this problem, machine learning system 102 may use Exponential Moving Average (EMA) to estimate the recall and calculate an EMA recall loss, as set forth below:

$$\tilde{R}_{c,t=}\alpha R_{c,t} + (1-\alpha)R_{c,t} - 1 \quad \text{(Equation 11)}$$

In the foregoing example, the region metric on which machine learning system 102 bases the cross entropy loss function is a Recall loss function. However, the region metric may include other types of loss functions, such as a Recall loss function, a Precision loss function, a Dice loss function, a Jaccard loss function, an F1 loss function, a Tversky loss function, or other types of loss functions not expressly described herein.

Table 1 depicts different types of region metrics, along with their set representation and Boolean representation. TP, FN, and FP stand for True Positive, False Negative, and False Positive respectively. The subscript c indicates that the metric is calculated for each class.

TABLE 1

| | Recall ($G_c$, $P_c$) | Precision ($G_c$, $P_c$) | Dice ($G_c$, $P_c$) |
|---|---|---|---|
| Set Rep. | $\frac{\lvert G_c \cap P_c \rvert}{\lvert G_c \rvert}$ | $\frac{\lvert G_c \cap P_c \rvert}{\lvert P_c \rvert}$ | $\frac{2\lvert G_i \cap P_c \rvert}{\lvert P_c \rvert + \lvert G_c \rvert}$ |

TABLE 1-continued

| | | | |
|---|---|---|---|
| Boolean Rep. | $\frac{TP_c}{TP_c + FN_c}$ | $\frac{TP_c}{TP_c + FP_c}$ | $\frac{2TP_c}{2TP_c + FP_c + FN_c}$ |
| | Jaccard ($G_c$, $P_c$) | F1 ($G_c$, $P_c$) | Tversky ($G_c$, $P_c$ |
| Set Rep. | $\frac{\lvert G_c \cap P_c \rvert}{\lvert G_c \cup P_c \rvert}$ | $\frac{\lvert G_i \cap P_c \rvert}{\lvert G_c \cup P_c \rvert + \frac{1}{2}\lvert P_c \rvert + \frac{1}{2}\lvert G_c \rvert}$ | $\frac{\lvert G_i \cap P_c \rvert}{\lvert G_c \cup P_c \rvert + \alpha \lvert P_c \rvert + \beta \lvert G_c \rvert}$ |
| Boolean Rep. | $\frac{TP_c}{TP_c + FN_c + FN_c}$ | $\frac{TP_c}{TP_c + \frac{1}{2}FP_c + \frac{1}{2}FN_c}$ | $\frac{TP_c}{TP_c + \alpha FP_c + \beta FN_c}$ |

As described above, in other examples, the region metric may be another metric, such as F1, Dice, Jaccard and Tversky, instead of Recall. As another example, $G_c$ and $P_c$ denote a set of Ground Truth (positive) samples and Predicted samples for class c, respectively. $FP_c$ and $TN_c$ denote a set of False Positive and True Negative samples respectively for class c. Other terms are defined similarly. Recall is different from the other metrics in that Recall does not include False Positive $FP_c$ in the denominator (as depicted in Table 1 above). This distinction makes a Recall loss function more ideal for weighting cross entropy loss. Referring back to Equation 5, where recall loss is defined as the weighted cross entropy by $1-R_c$, replacing the recall loss function with any other metric above may result in FP appearing in the numerator of the weights.

As one example, the one or more region metrics are computed according to a Recall loss function. The Recall loss function is defined as according to:

$$-\sum_{c=1}^{C} \frac{FN_c}{FN_c + TP_c} N_c \log(P^c), \quad \text{(Equation 12)}$$

wherein c is a class belonging to the set $c \in \{1, \ldots, C\}$, $FN_c$ is the number of false negatives for class c, $TP_c$ is the number of true positives for class c, $N_c$ is the number of samples in class c, and $P^c$ is the geometric mean confidence of class c.

As another example, the one or more region metrics are computed according to a Precision loss function. The Precision loss function is defined as according to:

$$-\sum_{c=1}^{C} \Sigma_{n:y_i=c} \left( \frac{FP_c}{FP_c + TP_c} \right)^{\gamma} \log(p_n^{y_n}), \quad \text{(Equation 13)}$$

wherein c is a class belonging to the set $c \in \{1, \ldots, C\}$, $n:y_i=c$ denotes all samples such that the ground truth label $y_i$ is class c, $FP_c$ is the number of false positives for class c, $TP_c$ is the number of true positives for class c, $\gamma$ is a scalar hyperparameter, and $$p_n^{y_n}$$

is a predicted probability of class $y_n$ for sample n.

In some examples, a recall loss function may be preferable to a precision loss function because, for a precision loss function, a large false positive count in a class may result in a large weight, which may further encourage false detection for that class. This may result in the number of false positives to increase. From a different perspective, because in cross entropy loss, the ground truth samples $i \in G_c = \{i:y_i=c$ for a class c are penalized, a proper weighting should be proportional to $FN_c \subseteq G_c$ but not $FP_c \subset G_c$, which does not belong to the set of ground truth samples. The same analysis can be applied to other metrics involving false positives.

As another example, the one or more region metrics are computed according to a Dice loss function. The Dice loss function is defined as according to:

$$-\sum_{c=1}^{C} \left(1 - \frac{2TP_c}{2TP_c + FP_c + FN_c}\right) N_c \log(P^c), \quad \text{(Equation 14)}$$

wherein c is a class belonging to the set $c \in \{1, \ldots, C\}$, $TP_c$ is the number of true positives for class c, $FP_c$ is the number of false positives for class c, $FN_c$ is the number of false negatives for class c, $N_c$ is the number of samples in class c, and $P^c$ is the geometric mean confidence of class c.

As another example, the one or more region metrics are computed according to a Jaccard loss function. The Jaccard loss function is defined as according to:

$$-\sum_{c=1}^{C} \left(1 - \frac{TP_c}{TP_c + FP_c + FN_c}\right) N_c \log(P^c), \quad \text{(Equation 15)}$$

wherein c is a class belonging to the set $c \in \{1, \ldots, C\}$, $TP_c$ is the number of true positives for class c, $FP_c$ is the number of false positives for class c, $FN_c$ is the number of false negatives for class c, $N_c$ is the number of samples in class c, and $P^c$ is the geometric mean confidence of class c.

As another example, the one or more region metrics are computed according to an F1 loss function. The F1 loss function is defined as according to:

$$-\sum_{c=1}^{C} \left(1 - \frac{TP_c}{TP_c + \frac{1}{2}FP_c + \frac{1}{2}FN_c}\right) N_c \log(P^c), \quad \text{(Equation 16)}$$

wherein c is a class belonging to the set $c \in \{1, \ldots, C\}$, $TP_c$ is the number of true positives for class c, $FP_c$ is the number of false positives for class c, $FN_c$ is the number of false negatives for class c, $N_c$ is the number of samples in class c, and $P^c$ is the geometric mean confidence of class c.

As another example, the one or more region metrics are computed according to a Tversky loss function. The Tversky loss function is defined as according to:

$$-\sum_{c=1}^{C}\left(1-\frac{TP_c}{TP_c+\alpha FP_c+\beta FN_c}\right)N_c\ \log(P^c), \qquad \text{(Equation 17)}$$

wherein c is a class belonging to the set c∈{1, . . . , C}, $TP_c$ is the number of true positives for class c, $FP_c$ is the number of false positives for class c, $FN_c$ is the number of false negatives for class c, $N_c$ is the number of samples in class c, α and β are parameters of the Tversky index, and $P^c$ is the geometric mean confidence of class c.

As described above, machine learning system 102 may use a loss function based on one or more region metrics, such as a recall loss function. Machine learning system 102 implements a loss function which uses a hard-class mining strategy to improve model performance on imbalanced datasets. Specifically, a region metric such as recall loss weighs examples in a class based on its instantaneous recall performance during training, and the weights change dynamically to reflect relative change in performance among classes. A machine learning system using a loss function based on one or more region metrics, as described herein, may improve a performance metric of the machine learning system for each class of the plurality of classes, such as improving accuracy for a class while maintaining a competitive IOU performance for the class, in semantic segmentation. Furthermore, where the region metric is Recall loss, the machine learning system may improve both accuracy and precision significantly in small networks, which possesses limited representation power and is more prone to biased performance due to data imbalance. A machine learning system as described herein may use both synthetic and real training data, and may be robust to label noise present in real datasets. Additionally, where the region metric is the EMA version of Recall loss, the machine learning system may be able to handle an extremely large numbers of classes and provides a stable improvement on representation learning. Additionally, a machine learning system as described herein may facilitate representation learning in image understanding. Using the simple decoupled training strategy and a loss function based on one or more region metrics, such as recall loss, a machine learning system as described herein may outperform machine learning systems that use other types of loss functions with respect to common imbalance learning benchmarks.

A machine learning system that uses a loss function based on region metrics as described herein may be particularly useful for datasets where class imbalance is the most limiting factor or imbalanced datasets that have visual features that may not be distinctive or easy to classify. The loss function based on region metrics described herein may provide advantages over other loss functions where the machine learning system has reasonably high overall accuracy but low mean accuracy.

In some examples, machine learning system 102 implements DeepLabV3, available from Chen et al. with resnet-{18, 101} backbones for semantic segmentation. In some examples, machine learning system 102 uses the Adam optimizer described by Kingma & Ba with a learning rate of $10^{-3}$ and $10^{-4}$, without annealing, respectively. In some examples, machine learning system 102 may obtain increased performance with a larger batch size and using a stochastic gradient descent (SGD) optimizer with a learning schedule.

In some examples, training data 104 may include, e.g., a largescale outdoor semantic segmentation dataset, such as Synthia, available from Ros et al., or Cityscapes, available from Cordts et al. Synthia is a photorealistic synthetic dataset with different seasons, weather, and lighting conditions. In some examples, training data 104 includes the Synthia-sequence Summer split. On the Synthia dataset, images are resized to 768 by 384 pixels. Machine learning system 102 trains its resnet models for 100,000 iterations. Cityscapes includes real photos of urban street scenes in several cities in Europe. Cityscapes includes 5000 annotated images for training and another 5000 for evaluation. On the Cityscapes dataset, images are resized to 769 by 769 pixels, and machine learning system 102 trains machine learning model 106 for 90,000 iterations.

In some examples, machine learning system 102 may iteratively apply machine learning model 106 to training data 104 to perform image understanding, determine the cross entropy loss of machine learning model 106 for each class, determine the weight for each class based on the one or more region metrics, obtain the updated weighted cross entropy loss for each class, and update machine learning model 106 with the weighted cross entropy loss of each class. Each iteration may cause machine learning system 102 to recalculate, based on the one or more region metrics, the weights for each class and update machine learning model 106 with the recalculated weighted cross entropy loss for each class of the plurality of classes. Machine learning system 102 may improve a performance metric for each class of the plurality of classes, such as mean accuracy or a mean IOU, of machine learning model 106 with each training iteration. Therefore, by iteratively training machine learning model 106, machine learning system 102 may dynamically adjust the weights applied to the cross entropy loss, thereby improving learning and performance of machine learning model 106.

In the foregoing example, a training operation with respect to single image 114 is described for convenience. However, typically, machine learning system 102 trains machine learning model 106 on hundreds, if not thousands, of labeled images 114. Typically, the larger the training data 104 upon which machine learning model 106 is trained, the more robust and accurate machine learning model 106 may be after completing the training operation.

In some examples, after machine learning system 102 has trained machine learning model 106 to perform image understanding, machine learning system receives an input image, such as image 112. This may occur after machine learning system 102 has trained machine learning model 106 with labeled images 114 to perform image understanding to a predetermined level of accuracy. Image 112 comprises a plurality of pixels. In some examples, image 112 is an image captured of an environment of system 100, such as by one or more imaging devices of an autonomous vehicle (not depicted in FIG. 1). Typically, the pixels of image 112 are not labeled, e.g., do not include labels specifying classes to which the pixels belong. However, the pixels of image 112 may depict examples of the classes with which machine learning model 106 has been trained (e.g., with training data 104). As an example, the pixels of image 112 may depict examples of classes such as: Sky, Building, Pole, Road Marking, Road, Pavement, Tree, Sign Symbol, Fence, Vehicle, Pedestrian, and Bicycle. Machine learning system 102 applies machine learning model 106 to perform image understanding of each pixel of image 112 to determine an estimated class of the plurality of classes to which the pixel belongs.

In some examples, one or more output devices 204 are configured to output, to for presentation to a user, image understanding data 116. In some examples, image understanding data 116 comprises an identification of one or more classes to which each pixel of the plurality of pixels of image 112 belongs. In some examples, image understanding data 116 may comprise an indication of the estimated class of each pixel of image 112. In some examples, output devices 204 are configured to output, based on the estimated class of each pixel of image 114, navigation information for use by one or more of a moving vehicle or a mobile platform.

Output devices 204 may include a display, sound card, video graphics adapter card, speaker, presence-sensitive screen, one or more USB interfaces, video and/or audio output interfaces, or any other type of device capable of generating tactile, audio, video, or other output. Output devices 204 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, output devices 204 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, output devices 204 may include a presence-sensitive display that may serve as a user interface device that operates both as one or more input devices and one or more output devices.

Figure 3:
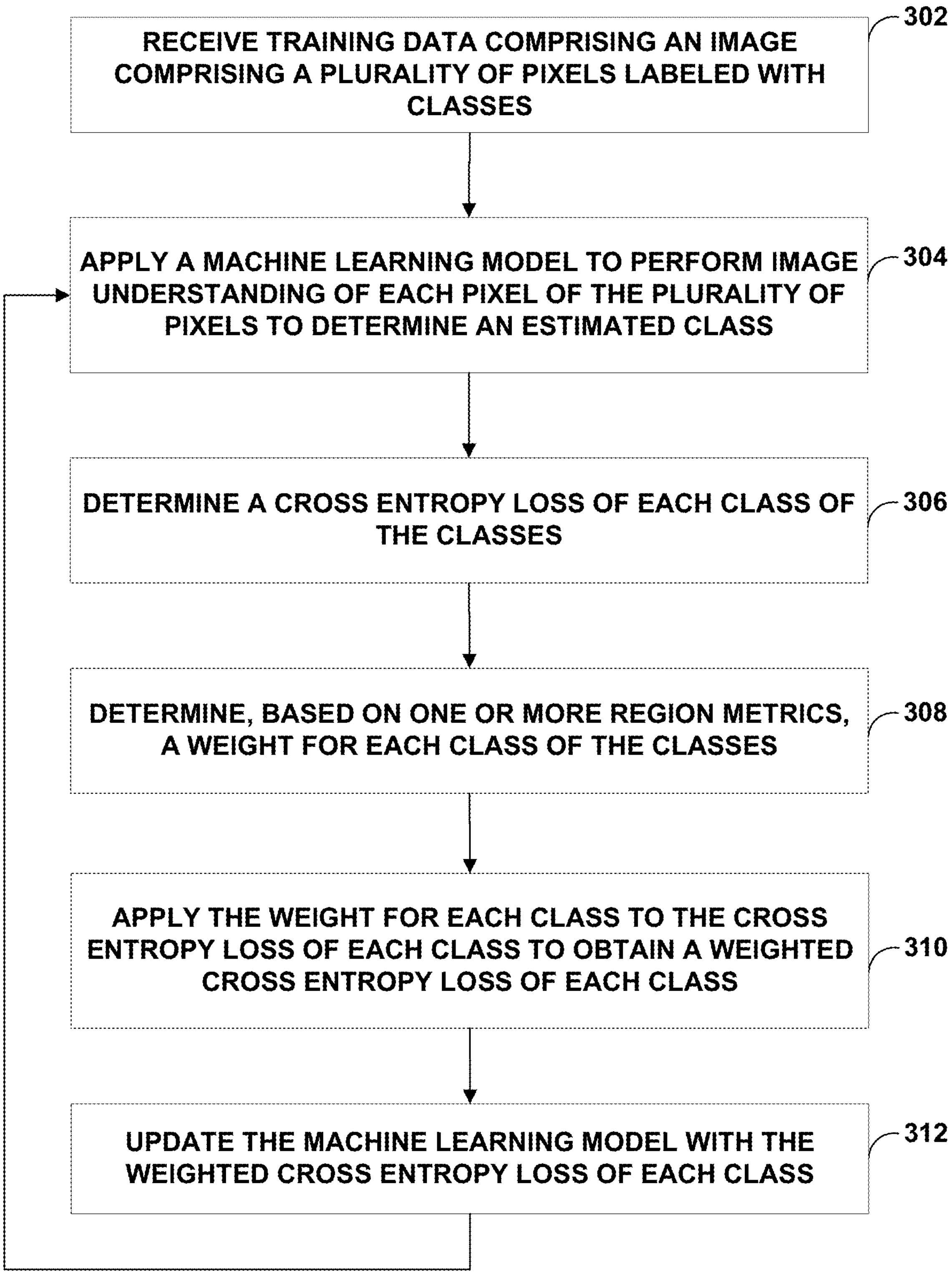
FIG. 3 is a flowchart illustrating an example operation for performing image understanding of a plurality of pixels of an image in accordance with the techniques of the disclosure.

FIG. 3 is a flowchart illustrating an example operation for performing image understanding of a plurality of pixels of an image in accordance with the techniques of the disclosure. For convenience, FIG. 3 is described with respect to FIGS. 1 and 2.

Input device 202 receives training data comprising labeled image 114 (302). Image 114 comprises a plurality of pixels. Each pixel of the plurality of pixels of image 114 is labeled with a class of a plurality of classes. In one example, the classes may include: Sky, Building, Pole, Road Marking, Road, Pavement, Tree, Sign Symbol, Fence, Vehicle, Pedestrian, and Bicycle. In other implementations, more, fewer, or other class labels may be used. Thus, each pixel may further be labeled with a corresponding class to which the pixel belongs (e.g., sky, road, pedestrian, etc.).

Processing circuitry 206 of computation engine 230 executes machine learning system 102. Machine learning system 102 applies machine learning model 106 to image 114 to perform image understanding of each pixel of the plurality of pixels of image 114 so to determine an estimated class to which the pixel belongs (304). In some examples, to perform image understanding of each pixel of the plurality of pixels of image 114, machine learning model 106 performs semantic segmentation of each pixel of the plurality of pixels. In some examples, to perform image understanding of each pixel of the plurality of pixels of image 114, machine learning model 106 performs object detection of an object represented in the plurality of pixels. In some examples, to perform image understanding of each pixel of the plurality of pixels of image 114, machine learning model 106 performs object recognition of the object represented in the plurality of pixels. In some examples, to perform image understanding of each pixel of the plurality of pixels of image 114, machine learning model 106 performs image recognition of the image comprising the plurality of pixels. In some examples, machine learning model 106 generates, for each pixel of image 114, an estimated class and a confidence that the estimated class is correct (e.g., such as a probability that the estimated class corresponds to the class with which the pixel is labeled).

Machine learning system 102 determines, based on the classes with which the plurality of pixels are labeled and the estimated classes of the plurality of pixels, a cross entropy loss of each class of the plurality of classes (306). For example, machine learning system 102 uses the classes with which the plurality of pixels are labeled to evaluate whether machine learning model 106 correctly estimated the classes of the plurality of pixels. Machine learning system 102 computes, for each class of the plurality of classes, a cross entropy of the class based on the accuracy of machine learning model 104 in determining the estimated classes of the plurality of pixels.

Machine learning system 102 determines, based on one or more region metrics, a weight for each class of the plurality of classes (308). In some examples, the one or more region metrics are computed according to a loss function, such as a Recall loss function, a Precision loss function, a Dice loss function, a Jaccard loss function, or a Tversky loss function. As an example where the one or more region metrics are computed according to a recall loss function, machine learning system 102 computes, for each class, a weight based on an instantaneous training recall performance of machine learning model 106 for that class. Further, machine learning system 102 applies the determined weight for each class of the plurality of classes to the cross entropy loss of that class to obtain a weighted cross entropy loss of the class (310). Machine learning system 102 updates machine learning model 106 with the weighted cross entropy loss of each class of the plurality of classes (312).

In some examples, machine learning system 102 may train machine learning model 106 by iteratively performing operations 304, 306, 308, 310, and 312, each iteration applying the updated machine learning model to labeled images 114 of training data 104 at subsequent instances of operation 304. Each iteration may cause machine learning system 102 to recalculate, based on the one or more region metrics, the weights for each class and update machine learning model 106 with the recalculated weighted cross entropy loss for each class of the plurality of classes. Machine learning system 102 may improve a performance metric for each class of the plurality of classes, such as mean accuracy or a mean IOU, of machine learning model 106 with each training iteration.

Figure 4:
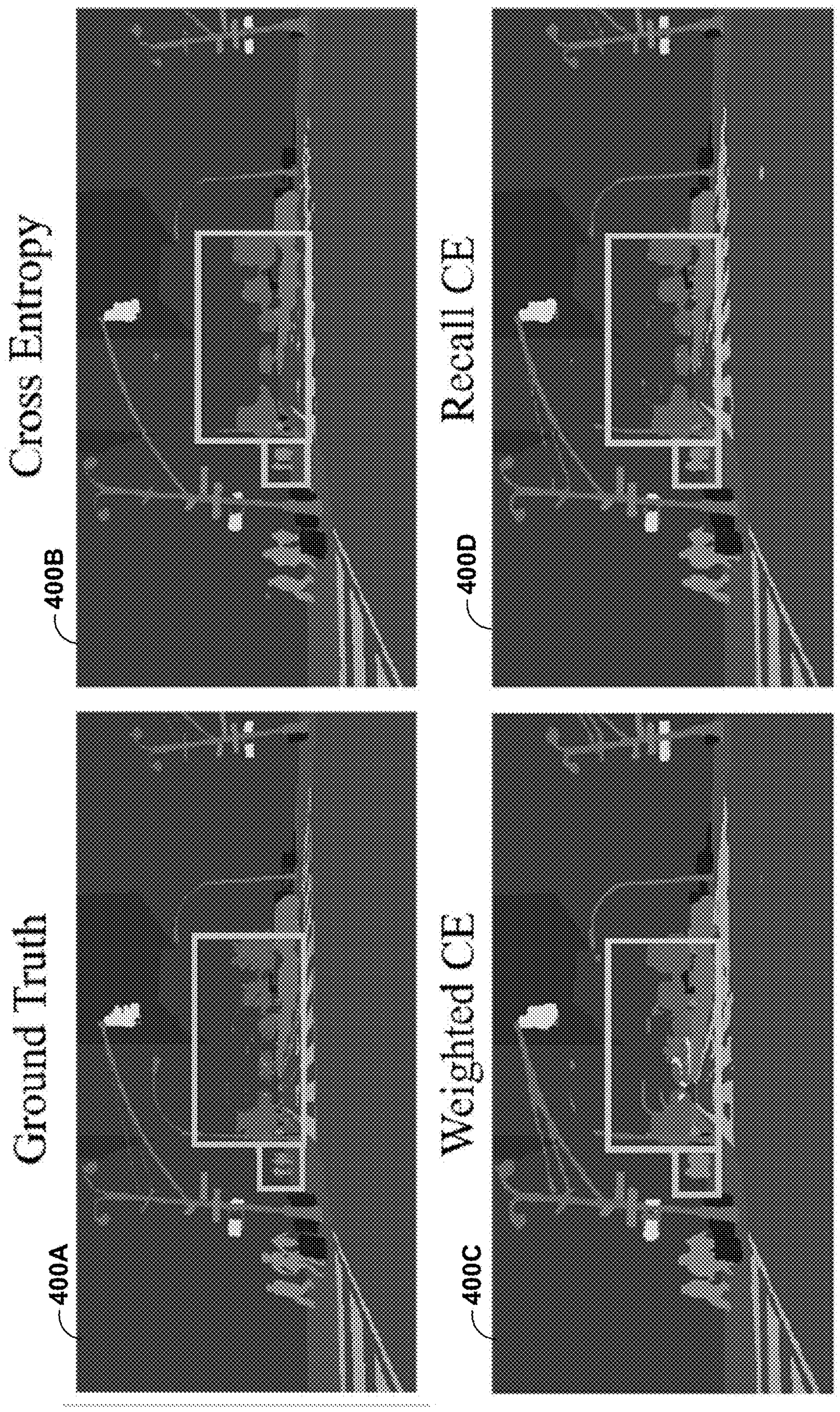
FIG. 4 is an illustration depicting examples of ground truth, cross entropy, weighted cross entropy, and recall cross entropy of image understanding of an image determined in accordance with the techniques of the disclosure.

FIG. 4 is an illustration depicting examples of ground truth 400A, cross entropy 400B, weighted cross entropy (CE) 400C, and recall cross entropy (CE) 400D of image understanding of an image determined in accordance with the techniques of the disclosure. Ground truth 400A depicts, for each pixel of image 114, an actual class to which the pixel belongs. Cross entropy 400B depicts an estimated class determined by machine learning model 106 for each pixel of image 114 where machine learning system 102 implements a cross entropy loss function. Weighted cross entropy 400C depicts an estimated class determined by machine learning model 106 for each pixel of image 114 where machine learning system 102 implements an inverse cross entropy loss function (also referred to as a "weighted cross entropy loss function"). Recall cross entropy 400D depicts an estimated class determined by machine learning model 106 for each pixel of image 114 where machine learning system 102 implements an loss function based on or more region metrics. In the example of FIG. 4, recall cross entropy 400D depicts an example where the region metric is a recall loss function.

As illustrated in the example of FIG. 4, the use of Recall cross entropy 400D as a loss function encourages machine learning model 106 of FIG. 1 to predict smaller classes, such as poles, lights and pedestrians. In contrast to the use of cross entropy 400B as a loss function, when machine learning model 106 is trained using Recall cross entropy 400D as a loss function, machine learning model 106 is able to more accurately identify finer details in image 114, especially for small classes. In contrast to the use of Recall cross entropy 400D as a loss function, the use of Weighted cross entropy 400C as a loss function yields excessive false positives on small classes and degrades segmentation quality significantly.

Figure 5:
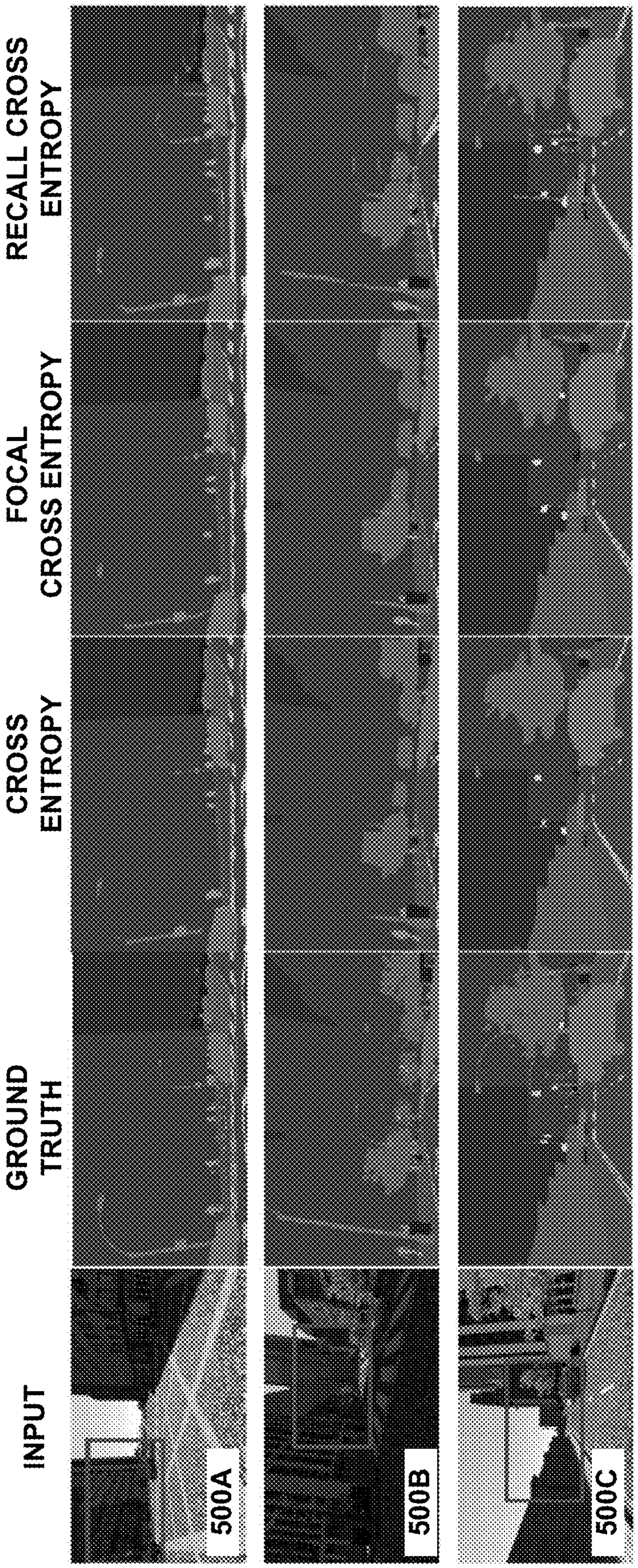
FIG. 5 is an illustration depicting examples of ground truth, cross entropy, weighted cross entropy, and recall cross entropy of image understanding of images determined in accordance with the techniques of the disclosure.

FIG. 5 is an illustration depicting examples of ground truth, cross entropy, weighted cross entropy, and recall cross entropy of image understanding of images 500A, 500B, and 500C (collectively, "images 500") determined in accordance with the techniques of the disclosure. Specifically, the ground truth depicts, for each pixel of images 500, an actual class to which the pixel belongs. The cross entropy depicts an estimated class determined by machine learning model 106 for each pixel of images 500 where machine learning system 102 implements a cross entropy loss function. The weighted cross entropy depicts an estimated class determined by machine learning model 106 for each pixel of images 500 where machine learning system 102 implements an inverse cross entropy loss function. The focal cross entropy depicts an estimated class determined by machine learning model 106 for each pixel of images 500 where machine learning system 102 implements a focal cross entropy loss function. The recall cross entropy depicts an estimated class determined by machine learning model 106 for each pixel of images 500 where machine learning system 102 implements an loss function based on or more region metrics. In the example of FIG. 5, the recall cross entropy depicts an example where the region metric is a recall loss function.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. An image understanding system comprising:
an input device configured to receive training data comprising an image comprising a plurality of pixels, each pixel of the plurality of pixels labeled with a class of a plurality of classes; and
a computation engine comprising processing circuitry for executing a machine learning system, wherein the machine learning system is configured to:
apply a machine learning model to perform image understanding of each pixel of the plurality of pixels to determine an estimated class of the plurality of classes to which the pixel belongs;
determine, based on the classes with which the plurality of pixels are labeled and the estimated classes of the plurality of pixels, a corresponding cross entropy loss for each class of the plurality of classes;
for each class of the plurality of classes, determine, based on one or more region metrics indicative of a performance of the machine learning model in identifying pixels as belonging to the class, a corresponding weight for the class;
adjust, for each class of the plurality of classes, the cross entropy loss for the class with the corresponding weight determined for the class to obtain a corresponding weighted cross entropy loss for the class; and
update the machine learning model with the corresponding weighted cross entropy loss for each class of the plurality of classes to improve a performance metric of the machine learning model for each class of the plurality of classes.

2. The system of claim 1, wherein the machine learning system is configured to iteratively apply the updated machine learning model to perform image understanding, determine the corresponding cross entropy loss for each class of the plurality of classes, determine, for each class of the plurality of classes, the corresponding weight for the class, adjust, for each class of the plurality of classes, the determined weight to obtain the corresponding weighted cross entropy loss for the class, and update the updated machine learning model with the corresponding weighted cross entropy loss for each class of the plurality of classes.

3. The system of claim 1,
wherein the input device is configured to receive a second image comprising a second plurality of pixels,
wherein the machine learning system is configured to apply the machine learning model to perform image understanding of each pixel of the second plurality of pixels to determine an estimated class of the plurality of classes to which the pixel belongs, and wherein the system further comprises an output device configured to output, for display to a user, an indication of the estimated class of the plurality of classes to which each pixel of the second plurality of pixels belongs.

4. The system of claim 1, wherein the input device is configured to receive a second image comprising a second plurality of pixels, wherein the machine learning system is configured to apply the machine learning model to perform image understanding of each pixel of the second plurality of pixels to determine an estimated class of the plurality of classes to which the pixel belongs, and wherein the system further comprises an output device configured to output, based on the estimated class of the plurality of classes to which each pixel of the second plurality of pixels belongs, navigation information for use by one or more of a moving vehicle or a mobile platform.

5. The system of claim 1, wherein the one or more region metrics are computed according to a Recall loss function.

6. The system of claim 1, wherein the one or more region metrics are computed according to at least one of:

a Precision loss function;

a Dice loss function;

a Jaccard loss function;

an F1 loss function; or a Tversky loss function.

7. The system of claim 1, wherein to apply the machine learning model to perform image understanding of each pixel of the plurality of pixels to determine the estimated class of the plurality of classes to which the pixel belongs, the machine learning system is configured to apply the machine learning model to perform at least one of:

semantic segmentation of each pixel of the plurality of pixels;

object detection of an object represented in the plurality of pixels;

object recognition of the object represented in the plurality of pixels; or image recognition of the image comprising the plurality of pixels.

8. The system of claim 1, wherein the one or more region metrics indicative of the performance of the machine learning model comprises at least one of a mean accuracy or a mean Intersection Over Union (IOU).

9. The system of claim 1, wherein the plurality of classes comprises an imbalanced plurality of classes such that a first class of the plurality of classes is represented in the training data more frequently than a second class of the plurality of classes is represented in the training data.

10. The system of claim 1, wherein the cross entropy loss for each class of the plurality of classes comprises a probability, for each class of the plurality of classes, that an estimated class corresponds to a class of a label applied to a pixel, an object, or an image of the training data.

11. The system of claim 2, wherein to iteratively determine, for each class of the plurality of classes, the corresponding weight for the class, the machine learning system is configured to:

reduce the corresponding weight for the class as the one or more region metrics for the class increases; and increase the corresponding weight for the class as the one or more region metrics for the class decreases.

12. A method for image understanding comprising:

receiving, by an input device, training data comprising an image comprising a plurality of pixels, each pixel of the plurality of pixels labeled with a class of a plurality of classes;

applying, by a machine learning system of a computation engine executed by processing circuitry, a machine learning model to perform image understanding of each pixel of the plurality of pixels to determine an estimated class of the plurality of classes to which the pixel belongs;

determining, by the machine learning system and based on the classes with which the plurality of pixels are labeled and the estimated classes of the plurality of pixels, a corresponding cross entropy loss for each class of the plurality of classes;

for each class of the plurality of classes, determining, by the machine learning system and based on one or more region metrics indicative of a performance of the machine learning model in identifying pixels as belonging to the class, a corresponding weight for the class;

adjusting, by the machine learning system and for each class of the plurality of classes, the cross entropy loss for the class with the corresponding weight determined for the class to obtain a corresponding weighted cross entropy loss for the class; and updating, by the machine learning system, the machine learning model with the corresponding weighted cross entropy loss for each class of the plurality of classes to improve a performance metric of the machine learning model for each class of the plurality of classes.

13. The method of claim 12, further comprising iteratively applying the updated machine learning model to perform image understanding, determining the corresponding cross entropy loss for each class of the plurality of classes, determining, for each class of the plurality of classes, the corresponding weight for the class, adjusting, for each class of the plurality of classes, the determined weight to obtain the corresponding weighted cross entropy loss for the class, and updating the updated machine learning model with the corresponding weighted cross entropy loss for each class of the plurality of classes.

14. The method of claim 12, further comprising:

receiving, by the input device, a second image comprising a second plurality of pixels;

applying, by the machine learning system, the machine learning model to perform image understanding of each pixel of the second plurality of pixels to determine an estimated class of the plurality of classes to which the pixel belongs; and outputting, by an output device and for display to a user, an indication of the estimated class of the plurality of classes to which each pixel of the second plurality of pixels belongs.

15. The method of claim 12, wherein the one or more region metrics are computed according to a Recall loss function.

16. The method of claim 12, wherein the one or more region metrics are computed according to at least one of:

a Precision loss function;

a Dice loss function;

a Jaccard loss function;

an F1 loss function; or a Tversky loss function.

17. The method of claim 12, wherein the one or more region metrics indicative of the performance of the machine learning model comprises at least one of a mean accuracy or a mean Intersection Over Union (IOU).

18. The method of claim 12, wherein the plurality of classes comprises an imbalanced plurality of classes such that a first class of the plurality of classes is represented in the training data more frequently than a second class of the plurality of classes is represented in the training data.

19. The method of claim 13, wherein iteratively determining, for each class of the plurality of classes, the corresponding weight for the class comprises:

reducing the corresponding weight for the class as the one or more region metrics for the class increases; and increasing the corresponding weight for the class as the one or more region metrics for the class decreases.

20. A non-transitory, computer-readable medium comprising instructions for causing processing circuitry of an image understanding system to:

receive training data comprising an image comprising a plurality of pixels, each pixel of the plurality of pixels labeled with a class of a plurality of classes; and execute a machine learning system configured to:

apply a machine learning model to perform image understanding of each pixel of the plurality of pixels to determine an estimated class of the plurality of classes to which the pixel belongs;

determine, based on the classes with which the plurality of pixels are labeled and the estimated classes of the plurality of pixels, a corresponding cross entropy loss for each class of the plurality of classes;

for each class of the plurality of classes, determine, based on one or more region metrics indicative of a performance of the machine learning model in identifying pixels as belonging to the class, a corresponding weight for the class;

adjust, for each class of the plurality of classes, the cross entropy loss for the class with the corresponding weight determined for the class to obtain a corresponding weighted cross entropy loss for the class; and update the machine learning model with the corresponding weighted cross entropy loss for each class of the plurality of classes to improve a performance metric of the machine learning model for each class of the plurality of classes.

* * * * *